United States Patent
Hodgetts (10) Patent No.: US 10,138,003 B2
(45) Date of Patent: Nov. 27, 2018

(54) FOIL DEPLOYMENT MECHANISM

(71) Applicant: EUROPEAN SPACE AGENCY, Paris (FR)

(72) Inventor: Paul Hodgetts, Sassenheim (NL)

(73) Assignee: EUROPEAN SPACE AGENCY, Paris (FR)

( * ) Notice: Subject to any disclaimer, the term of this patent is extended or adjusted under 35 U.S.C. 154(b) by 132 days.

(21) Appl. No.: 15/033,175

(22) PCT Filed: Oct. 30, 2013

(86) PCT No.: PCT/EP2013/072736
§ 371 (c)(1),
(2) Date: Apr. 29, 2016

(87) PCT Pub. No.: WO2015/062650
PCT Pub. Date: May 7, 2015

(65) Prior Publication Data
US 2016/0257434 A1 Sep. 8, 2016

(51) Int. Cl.
*B65H 29/00* (2006.01)
*B64G 1/22* (2006.01)
(Continued)

(52) U.S. Cl.
CPC .............. *B64G 1/222* (2013.01); *B64G 1/44* (2013.01); *H02S 40/22* (2014.12); *Y02E 10/52* (2013.01)

(58) Field of Classification Search
CPC ........... B65G 1/44; Y02E 10/52; H02S 40/22; Y02T 16/5257
(Continued)

(56) References Cited

U.S. PATENT DOCUMENTS 5,826,832 A * 10/1998 Stich ................... B64G 1/222
244/172.6
6,008,447 A * 12/1999 Meurer ................. B64G 1/222
136/245
(Continued)

FOREIGN PATENT DOCUMENTS

| JP | H01-122800 A | 5/1989 | |
| WO | 2009/153454 A2 | 12/2009 | |
| WO | WO 2013/128236 * | 9/2013 | ................ G01J 1/20 |

OTHER PUBLICATIONS

Jun. 27, 2014 International Search Report issued in International Patent Application No. PCT/EP2013/072736.
(Continued)

*Primary Examiner* — Lynn E Schwenning
(74) *Attorney, Agent, or Firm* — Oliff PLC (57) ABSTRACT

A foil deployment mechanism comprises a first drum rotatable about a first longitudinal axis, and a second drum rotatable about a second longitudinal axis. The foil deployment mechanism further comprises a cable, the cable comprising a first section which extends from a lower part of the second drum to an upper part of the first drum, a second section which is wound around a part of the first drum facing away from the second drum, a third section which extends from a lower part of the first drum to an upper part of the second drum, and a fourth section which is wound around a part of the second drum facing away from the first drum, wherein the first section and the third section intersect each other between the first drum and the second drum when being viewed along the first longitudinal axis.

14 Claims, 5 Drawing Sheets

(51) Int. Cl.
*B64G 1/44* (2006.01)
*H02S 40/22* (2014.01)

(58) Field of Classification Search
USPC .................................. 414/788; 16/228, 302
See application file for complete search history.

(56) References Cited

U.S. PATENT DOCUMENTS

| | | | |
|---|---|---|---|
| 6,505,381 B1 | 1/2003 | Thomson et al. | |
| 6,655,902 B2* | 12/2003 | Dube .................. | B65G 57/035 198/774.3 |
| 6,682,020 B2* | 1/2004 | Janson .................. | B64G 1/222 244/172.6 |
| 6,945,499 B1* | 9/2005 | Robinson ............. | B64G 1/1085 104/173.1 |
| 2011/0147532 A1* | 6/2011 | Chaix .................... | B64G 1/222 244/172.6 |
| 2015/0040964 A1* | 2/2015 | Matalon ............. | H01L 31/0422 31/422 |

OTHER PUBLICATIONS

Jun. 27, 2014 Written Opinion issued in International Patent Application No. PCT/EP2013/072736.

* cited by examiner

FOIL DEPLOYMENT MECHANISM

The present invention relates to a foil deployment mechanism. Further, the present invention relates to a foil deployment system and a solar panel.

In recent years, there has been interest in providing solar panels with optical concentrators. The use of an optical concentrator enables the amount of light incident on the solar panel to be increased. This makes it possible to replace costly solar cells and solar panel substrates by cheap concentrator surfaces while maintaining the electrical output of the solar array.

In the meantime, many different types of optical concentrators have been proposed. Optical concentrators may for example have the shape of a lens and may directly be positioned above the solar panel surface. Alternatively, concentrators may for example have the shape of a reflective surface and be mounted along the edges of the solar panel.

It is an object of the present invention to provide a means of enabling a simple and reliable use of concentrators, in particular in conjunction with solar panels, at a low cost.

In order to solve the above object, a foil deployment mechanism is provided. Further, a foil deployment system is provided. Last, a concentrator solar panel is provided.

According to an embodiment of the present invention, a foil deployment mechanism comprises a first drum rotatable about a first longitudinal axis, and a second drum rotatable about a second longitudinal axis. The foil deployment mechanism further comprises a cable which can be moved in a first direction by rotating the first drum in a first rotation direction and in a second direction opposed to the first direction by rotating the second drum in a second rotation direction opposed to the first rotation direction. The cable comprises a first section which extends from a lower part of the second drum to an upper part of the first drum, a second section which is wound around a part of the first drum facing away from the second drum, a third section which extends from a lower part of the first drum to an upper part of the second drum, and a fourth section which is wound around a part of the second drum facing away from the first drum, wherein the first section and the third section intersect each other between the first drum and the second drum when being viewed along the first longitudinal axis. In other words, the cable has the shape of a "lying 8" when viewed along the first longitudinal axis. Further, a longitudinal rigid element having a first end and a second end is provided, wherein the first end is connected to the cable, and wherein the second end is connectable or connected to a foil. By moving the cable, the longitudinal rigid element can be moved between a first state (foil retracted state) in which the first end of the longitudinal rigid element is connected to the first section of the cable, and in which the second end of the longitudinal rigid element protrudes from the first drum in a direction pointing away from the second drum, and a second state (foil extended state) in which the second end of the longitudinal rigid element protrudes in a direction pointing away from the second drum, wherein a distance between the second end and the first drum (e.g. a distance between the second end and the first longitudinal axis of the first drum) is smaller in the first state than in the second state. In this way, the foil can be extended or retracted, depending on the moving direction of the cable. One advantage of the above foil deployment mechanism is that it is simple. A further advantage is that it can be easily extended on demand by adding a further rigid longitudinal element to the cable which is connectable or connected to a further foil. By extending the foil deployment mechanism, it is capable to expand or contract both the foil and the further foil simultaneously based on only one move of the cable. That is, the foil deployment mechanism can be extended in its functionality by only adding a minimum amount of additional elements (by adding the further rigid longitudinal element).

The foil deployment mechanism may further comprise a third drum arranged adjacent to the first drum and being rotatable around a third longitudinal axis, wherein the third drum is arranged such that the foil can be wound onto the third drum by rotating the third drum in a third rotation direction (retraction of the foil), and can be unwound from the third drum by rotating the third drum in a fourth rotation direction opposite to the third rotation direction (extension of the foil). The foil is wound onto the third drum by moving the cable such that the longitudinal rigid element shifts in a first moving direction, and the foil is unwound from the third drum by moving the cable such that the longitudinal rigid element shifts in a second moving direction opposed to the first moving direction. In the first state, the amount of foil wound onto the third drum is larger than in the second state. The use of the third drum enables a very compact foil deployment mechanism since the amount of space needed by the foil in its wrapped state (in which it is wrapped around the third drum), i.e. in the retraction state, is very small.

The first longitudinal axis, the second longitudinal axis, and the third longitudinal axis may be aligned parallel with respect to each other. The first longitudinal axis, the second longitudinal axis, and the third longitudinal axis may for example respectively be part of a common plane.

The foil deployment mechanism may comprise a guiding structure for guiding a movement of the longitudinal rigid element, wherein the guiding structure is configured such that an angle between an alignment of the cable in the first section and the longitudinal rigid element is changed in a first manner (e.g. increased) when the first end of the longitudinal rigid element moves from an upper part of the first drum towards a lower part of the first drum while being connected to the second section of the cable. Likewise, when moving the first end of the longitudinal rigid element from a lower part of the first drum towards an upper part of the first drum while being connected to the second section of the cable, the angle between an alignment of the cable in the first section and the longitudinal rigid element is changed in a second, opposite manner (e.g. decreased). The foil deployment mechanism may for example be configured such that, as soon as the first end of the longitudinal rigid element moves along the part of the first drum facing away from the second drum in a downward rotational direction, the angle increases, whereas, as soon as the first end of the longitudinal rigid element moves along the part of the first drum facing away from the second drum in an upward rotational direction, the angle decreases. The angle may remain constant as long as the first end of the longitudinal rigid element is connected to the first section of the cable. In this way, the angle is only increased after a large part of the foil or the complete foil has been unwrapped from the third drum.

In order to enable the guiding structure to increase/decrease the angle between the first section of the cable and the longitudinal rigid element, the guiding structure may be positioned adjacent to a side of the first drum which faces away from the second drum, wherein a space is provided between the guiding structure and the first drum. The space provided between the guiding structure and the first drum can be chosen in dependence on the maximum possible angle to be achieved between the first section of the cable and the longitudinal rigid element. The larger the maximum possible angle has to be, the smaller the space has to be chosen. The guiding structure thus serves, in addition to guiding the longitudinal rigid element, as part of a lever mechanism due to which the angle increases/decreases, wherein the space between the guiding structure and the first drum defines the maximum angle.

If the vertical position of an upper surface of the guiding structure is positioned above the vertical position of a lower surface of the first drum, it is ensured that it is not possible to move the first end of the longitudinal rigid element from the lower surface of the first drum towards the second drum since the guiding structure blocks the further movement of the longitudinal rigid element in a direction towards the second drum. Thus, an automatic blocking mechanism is provided which ensures that the angle between the first section of the cable and the longitudinal rigid element remains constant once the foil has been fully extended, and that the foil is not retracted again even if one tries to move the cable further in the foil extension direction.

The guiding structure may for example be a body having a curved surface element. For example, the guiding structure may be a drum. The drum may be rotatable around a fourth longitudinal axis.

The foil deployment mechanism may further comprise a holding element which is positioned adjacent to a side of the guiding structure which faces away from the second drum, and a strut, wherein a first end of the strut is connected to the holding element, and wherein a second end of the strut is connected to the second end of the rigid longitudinal element or to the foil. For example, the holding element may be a drum around which a part of the strut can be wound/unwound. In this way, when winding/unwinding the foil on/from the third drum, the strut is also wound/unwound onto/from a drum. Thus, additional stability is given to the foil in the unwound state, on the other hand the foil deployment mechanism still is very compact since also the strut can be extended and retracted.

The second end of the longitudinal rigid element may comprise a stopper which abuts against the guiding structure when moving the cable from the second state into the first state, thereby stopping the longitudinal rigid element from moving further towards the second drum. As a consequence, it is impossible, when moving the cable in a foil retraction direction, to further move the longitudinal rigid element in this direction after the foil is fully wound onto the third drum. That is, an automatic stop is provided. For example, the guiding structure may comprises a groove along which the longitudinal rigid element glides, and the stopper may be constituted by an enlarged end of the longitudinal rigid element which does not fit into the groove and therefore abuts against an end of the groove when moving the longitudinal rigid element towards the second drum.

The foil may have a light-reflective surface. In this way, the foil can be used as a reflector. This is in particular useful if the foil deployment mechanism is used in the context of a solar panel, wherein the solar panel is positioned between the first drum and the second drum. However, it should be mentioned that the foil deployment mechanism may be used also in other technical fields. For example, the foil deployment mechanism may be used to activate a shutter, e.g. to protect sensitive optical instruments temporarily from excessive sunlight. For example, unwinding the foil from the third drum may shield the instruments against sunlight (by the unwound foil), and winding the foil onto the third drum may expose the instruments to sunlight again.

According to an embodiment of the present invention, the foil deployment mechanism comprises a first longitudinal rigid element having a first end and a second end, wherein the first end is connected to the cable, and wherein the second end is connected to a first foil, and a second longitudinal rigid element having a first end and a second end, wherein the first end is connected to the cable, and wherein the second end is connected to a second foil. By moving the cable, the first longitudinal rigid element can be moved between a first state in which the first end of the first longitudinal rigid element is connected to the first section of the cable, and in which the second end of the first longitudinal rigid element protrudes from the first drum in a direction pointing away from the second drum, and a second state in which the second end of the first longitudinal rigid element protrudes in a direction pointing away from the second drum, wherein a distance between the second end and the first drum is smaller in the first state than in the second state. By moving the cable, the second longitudinal rigid element can be moved between a first state in which the first end of the second longitudinal rigid element is connected to the third section of the cable, and in which the second end of the second longitudinal rigid element protrudes from the second drum in a direction pointing away from the first drum, and a second state in which the second end of the second longitudinal rigid element protrudes in a direction pointing away from the first drum, wherein a distance between the second end and the second drum is smaller in the first state than in the second state. In this way, it is possible to wind/unwind two different foils (first foil, second foil) simultaneously even though only one cable is moved.

According to an embodiment of the present invention, a foil deployment system comprises a first and a second foil deployment mechanism unit. Each of them comprises a cable which can be moved by rotating the first drum in a first rotation direction and by rotating the second drum in a second rotation direction opposed to the first rotation direction, the cable comprising a first section which extends from a lower part of the second drum to an upper part of the first drum, a second section which is wound around a part of the first drum facing away from the second drum, a third section which extends from a lower part of the first drum to an upper part of the second drum, and a fourth section which is wound around a part of the second drum facing away from the first drum, wherein the first section and the third section intersect each other between the first drum and the second drum when being viewed along the first longitudinal axis. Further, each of them comprises a longitudinal rigid element having a first end and a second end, wherein the first end is connected to the cable, and wherein the second end is connected to a foil, wherein the foil to which the longitudinal rigid element of the first foil deployment mechanism unit is connected is the same foil to which the longitudinal rigid element of the second foil deployment mechanism unit is connected. By moving the cable of the first foil deployment mechanism unit, the longitudinal rigid element of the first foil deployment mechanism unit can be moved between a first state in which the first end of the longitudinal rigid element is connected to the first section of the cable, and in which the second end of the longitudinal rigid element protrudes from the first drum in a direction pointing away from the second drum, and a second state in which the second end of the longitudinal rigid element protrudes in a direction pointing away from the second drum, wherein a distance between the second end and the first drum in the first state is smaller than in the second state. By moving the cable of the second foil deployment mechanism unit, the longitudinal rigid element of the second foil deployment mechanism unit can be moved between a first state in which the first end of the longitudinal rigid element is connected to the first section of the cable, and in which the second end of the longitudinal rigid element protrudes from the first drum in a direction pointing away from the second drum, and a second state in which the second end of the longitudinal rigid element protrudes in a direction pointing away from the second drum, wherein a distance between the second end and the first drum in the first state is smaller than in the second state.

The foil deployment mechanism may comprise a spreader bar which connects the second ends of the longitudinal rigid elements with each other, and which is connected to the foil.

According to an embodiment of the present invention, a concentrator solar panel is provided, comprising a solar panel and a foil deployment mechanism connected to the solar panel or a foil deployment system according to an embodiment of the present invention.

In the following description, embodiments of the present invention will be illustrated by way of example while making reference to the following drawings, wherein.

In the following description, identical or similar parts are designated by the same reference numerals. Further, it should be noted that the drawings are of schematic nature only, i.e. they do not necessarily scale.

Figure 1:
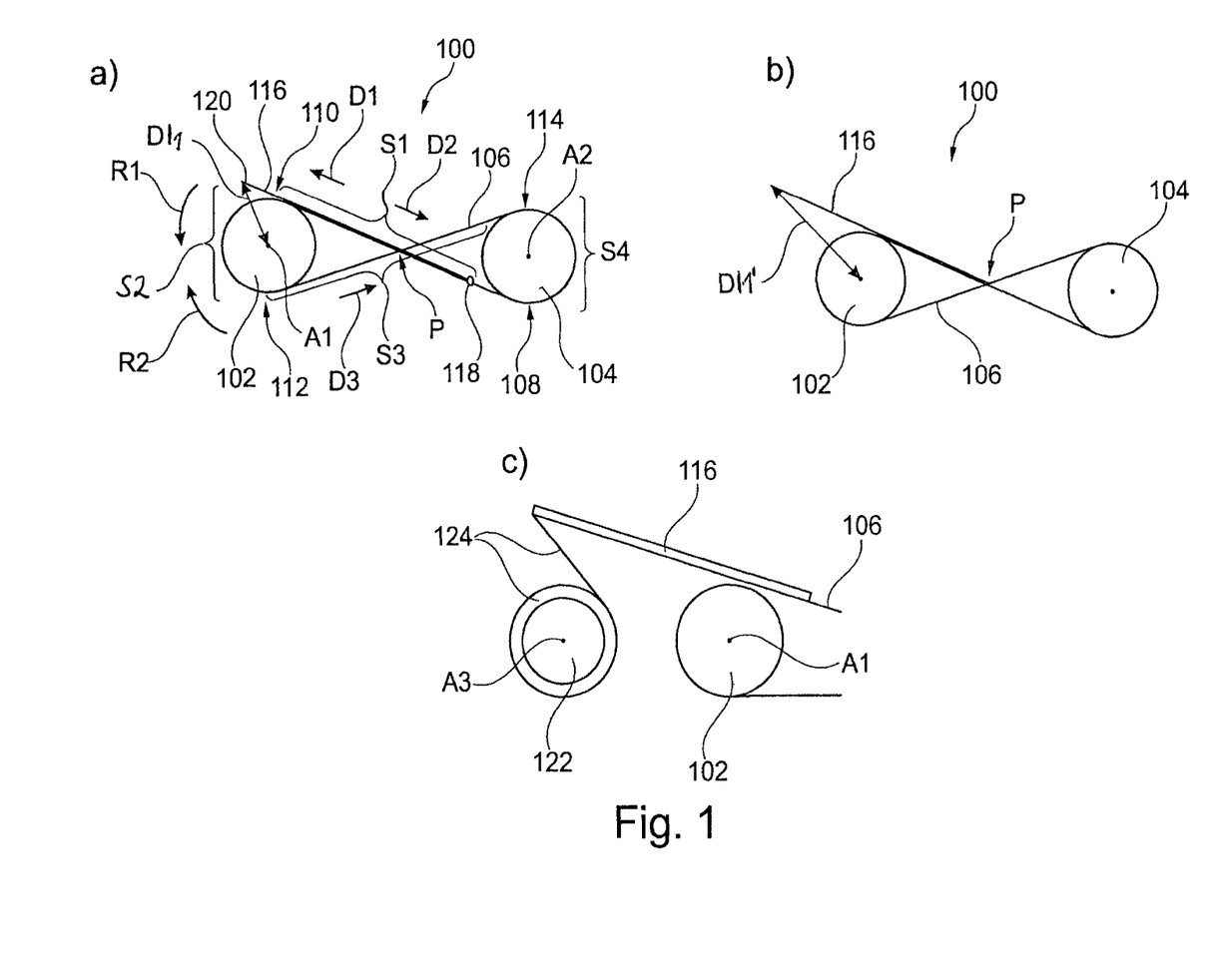
FIG. 1a shows a schematic cross-sectional view of a foil deployment mechanism according to an embodiment of the present invention in a first state.
FIG. 1b shows the foil deployment mechanism of FIG. 1a in a second state.
FIG. 1c shows a further detail of the foil deployment mechanism of FIG. 1a in the second state.

FIG. 1 shows a foil deployment mechanism 100 according to an embodiment of the present invention. The foil deployment mechanism 100 comprises a first cylindrical drum 102 rotatable about a first longitudinal axis A1, and a second cylindrical drum 104 rotatable about a second longitudinal axis A2. The foil deployment mechanism 100 further comprises a cable 106 which can be moved in a first direction D1 (to be more exactly, a first section S1 of the cable 106 is moved in the first direction D1) by rotating the first drum 102 in a first rotation direction R1 and by rotating the second drum 104 in a second rotation direction R2 opposed to the first rotation direction R1. Likewise, the cable 106 can be moved in a second direction D2 (to be more exactly, the first section S1 of the cable 106 is moved in the second direction D2) by rotating the first drum 102 in the second rotation direction R2 and by rotating the second drum 104 in a first rotation direction R1. The cable 106 comprises a first section S1 which extends from a lower part 108 of the second drum 104 to an upper part 110 of the first drum 102, a second section S2 which is wound around a part of the first drum 102 facing away from the second drum 104, a third section S3 which extends from a lower part 112 of the first drum 102 to an upper part 114 of the second drum 104, and a fourth section S4 which is wound around a part of the second drum 104 facing away from the first drum 102, wherein the first section S1 and the third section S3 intersect each other at a point P between the first drum 102 and the second drum 104 when being viewed along the first longitudinal axis A1 or the second longitudinal axis A2, thereby forming a "8" shifted by 90°. A longitudinal rigid element 116 having a first end 118 and a second end 120 is provided, wherein the first end 118 is connected to the cable 106, and wherein the second end 120 is connectable or connected to a foil (not shown). By moving the cable 106, the longitudinal rigid element 116 can be moved between a first state (FIG. 1a), foil retraction state) in which the first end 118 of the longitudinal rigid element 116 is connected to the first section S1 of the cable 106, and in which the second end 120 of the longitudinal rigid element 116 protrudes from the first drum 102 in the first direction D1 pointing away from the second drum 104, and a second state (FIG. 1b, foil extension state), in which the second end 120 of the longitudinal rigid element 116 protrudes in the first direction D1 pointing away from the second drum 104, wherein a distance between the second end 120 and the first drum 102 (here a distance DI1 between the second end 120 and the first longitudinal axis A1) is smaller in the first state than a corresponding distance DI1' in the second state. In this way, the foil can be extended or retracted, depending on the moving direction D1, D2 of the cable 106.

As can be derived from FIG. 1c), the foil deployment mechanism 100 may further comprise a third drum 122 arranged adjacent to the first drum 102 and being rotatable around a third longitudinal axis A3, wherein the third drum 122 is arranged such that a foil 124 can be wound onto the third drum 122 by rotating the third drum 122 in a third rotation direction R3 (retraction of the foil 124) which may correspond to the first rotation direction R1, and can be unwound from the third drum 122 by rotating the third drum 122 in a fourth rotation direction R4 opposite to the third rotation direction R3 (extension of the foil 124). The foil 124 is wound onto the third drum 122 by moving the cable 106 and thereby moving the longitudinal rigid element 116 in a first moving direction (which coincides with the first direction D1), and the foil 124 is unwound from the third drum 122 by moving the cable 106 and thereby moving the longitudinal rigid element 116 in a second moving direction (which coincides with the second direction D2) opposed to the first moving direction. In the first state, the amount of foil wound onto the third drum 122 is larger than in the second state. The use of the third drum 122 enables a very compact foil deployment mechanism since the amount of space needed by the foil 124 in its wrapped state (in which it is wrapped around the third drum 122), i.e. in the retraction state, is very small. The third drum 122 may be provided with a spring mechanism which causes the third drum 122 to automatically rotate such that the foil 124 is wound onto the third drum 122 as soon as the force causing there the foil 124 to be pulled away from the third drum 122 vanishes. The third drum 122 may also be arranged such that the third longitudinal axis A3 coincides with the first longitudinal axis A1. In this case, the first drum 102 would be an "extension" of the third drum.

The first longitudinal axis A1, the second longitudinal axis A2, and the third longitudinal axis A3 may be aligned parallel with respect to each other. The first longitudinal axis A1, the second longitudinal axis A2, and the third longitudinal axis A3 may for example respectively be part of a common plane.

Figures 2A, 2B, 2C:
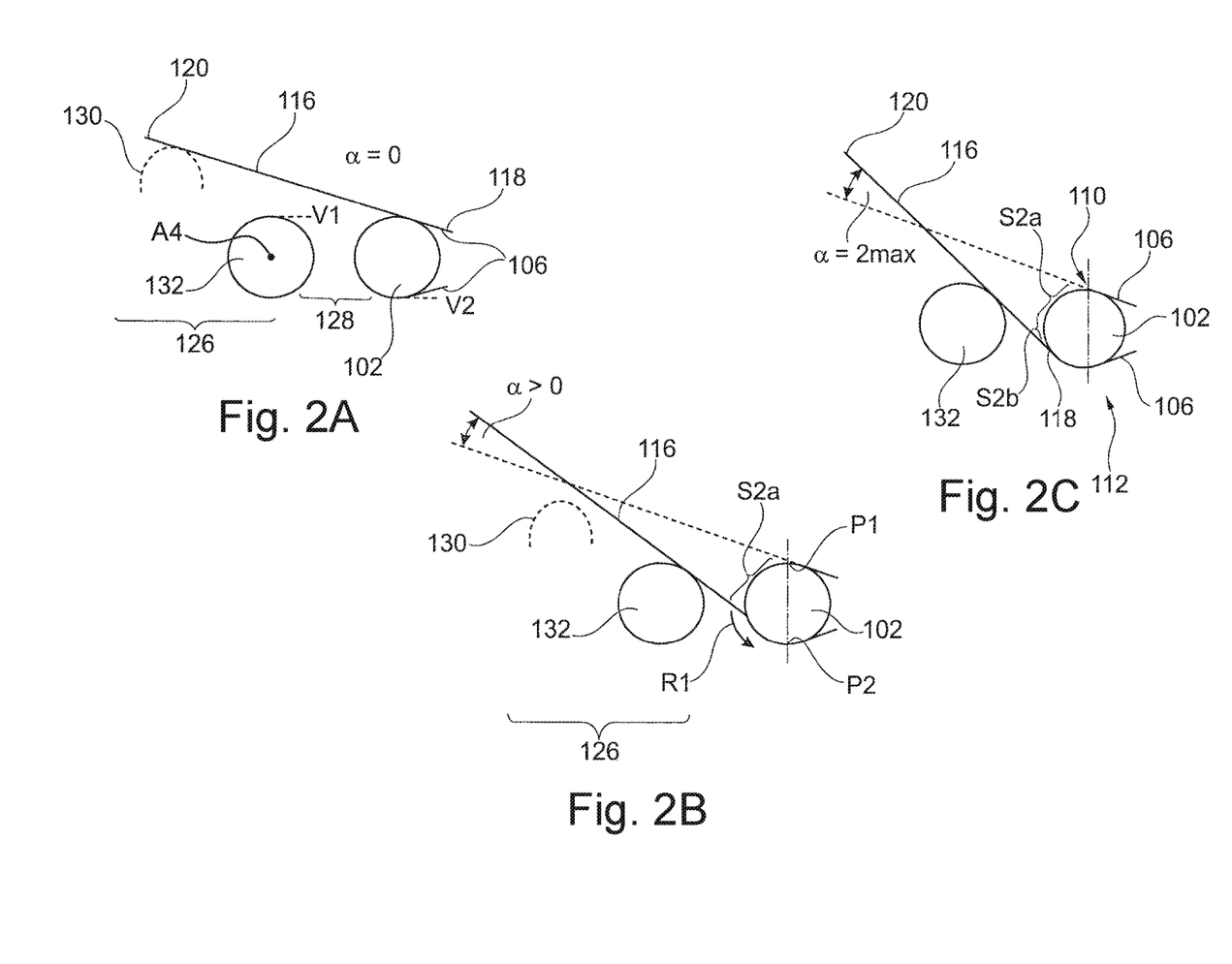
FIG. 2a shows a schematic cross-sectional view of a foil deployment mechanism according to an embodiment of the present invention in a first state.
FIG. 2b shows the foil deployment mechanism of FIG. 2a in a second state.
FIG. 2c shows the foil deployment mechanism of FIG. 2b in a third state.

As shown in FIG. 2, the foil deployment mechanism 100 may comprise a guiding structure 126 for guiding a movement of the longitudinal rigid element 116 caused by moving the cable 106. In this embodiment, the guiding structure 126 comprises a first guiding element 132 which has the shape of a drum. The first guiding element 132 may be rotatable about a fourth longitudinal axis A4. The guiding structure 126 is configured such that an angle $\alpha$ between an alignment of the first section S1 of the cable 106 and the longitudinal rigid element 116 is changed if the longitudinal rigid element 116 is in contact with the first guiding element 132, and the first end 118 of the longitudinal rigid element 116 moves from an upper part 110 of the first drum 102 towards a lower part 112 of the first drum 102, or vice versa. FIGS. 2a) to 2c) show different stages during an exemplary foil extension process as well as corresponding values of the angle $\alpha$. In a first stage shown in FIG. 2a), the longitudinal rigid element 116 is not yet in contact with the first guiding element 132 since the first end 118 of the longitudinal rigid element 116 is still connected to the first section S1 of the cable 106, i.e. the first end 118 has not yet passed an upper point P1 of the first drum 102. Consequently, the value of the angle $\alpha$ is zero. In a second stage shown in FIG. 2b), the first end 118 has passed the upper point P1 of the first drum 102, i.e. the first end 118 of the longitudinal rigid element 116 has already moved, in the first rotation direction R1, along a part S2a of the first drum 102 facing away from the second drum 104 (that is, the first end 118 of the longitudinal rigid element 116 is in contact with the second section S2 of the cable 106). In the second stage, the longitudinal rigid element 116 is already in contact with the first guiding element 132, and the value of the angle $\alpha$ is larger than zero. In a third stage shown in FIG. 2c), the first end 118 of the longitudinal rigid element 116 has moved further down in the first rotation direction R1, along a part S2b of the first drum 102 facing away from the first guiding element 132. In the second stage, the longitudinal rigid element 116 is still in contact with the first guiding element 132, and the value of the angle $\alpha$ is larger than in the second stage. That is, when moving from the second stage to the third stage, the value of the angle $\alpha$ constantly increases. Likewise, when moving from the third stage to the second stage, the value of the angle $\alpha$ constantly decreases. Since the angle $\alpha$ only increases after the first end 118 of the longitudinal rigid element 116 has passed the upper point P1 of the first drum 102, it is ensured that a large part of the foil 124 or the complete foil 124 has been unwrapped from the third drum 122 before the angle $\alpha$ increases.

In order to enable the guiding structure 126 to increase/decrease the angle $\alpha$, the guiding structure 126 is positioned adjacent to a side of the first drum 102 which faces away from the second drum 104, wherein a space 128 is provided between the first guiding element 132 and the first drum 102. The space 128 provided between the first guiding element 132 and the first drum 102 has to be chosen in dependence on the maximum possible angle $\alpha$ max to be achieved. For the particular space 128 as shown in FIG. 2, the maximum possible angle $\alpha$ max is shown in FIG. 2c). The larger the desired maximum possible angle $\alpha$ max, the smaller the space 128 has to be chosen. The first guiding element 132 thus serves as part of a lever mechanism due to which the angle $\alpha$ of the longitudinal rigid element 116 increases/decreases. In the embodiment of FIG. 1c, the first guiding element 132 may for example be provided between the first drum 102 and the third drum 122.

The guiding structure 126 may comprise further elements. For example, the guiding structure 126 may comprise a second guiding element 130 positioned adjacent to the first guiding element 132. The second guiding element 130 serves to guide the longitudinal rigid element 116 between the first stage and the second stage. That is, the second guiding element 130 serves to continually increase the angle $\alpha$ after the first end 118 has passed the upper point P1 of the first drum 102 until the longitudinal rigid element 116 contacts the first guiding element 132. As soon as the longitudinal rigid element 116 contacts the first guiding element 132, a lever mechanism is created by the first guiding element 132 which lifts the longitudinal rigid element 116 from the second guiding element 130 when the first end 118 of the longitudinal rigid element 116 is moved further down in the first rotation direction R1.

If a vertical position V1 of an uppermost surface point of the first guiding element 132 is positioned above a vertical position V2 of a lowermost surface point of the first drum 102, it is ensured that it is not possible to pass the first end 118 of the longitudinal rigid element 116 over the lowermost surface point of the first drum 102 towards the second drum 104 since the first guiding element 132 blocks the further movement of the longitudinal rigid element 116 in a direction towards the second drum 104. Thus, an automatic blocking mechanism is provided which ensures that the angle $\alpha$ remains constant once the foil 124 has been fully extended, and that the foil 124 is not retracted again even if one tries to rotate the first drum further in the first rotation direction R1.

Figure 3:
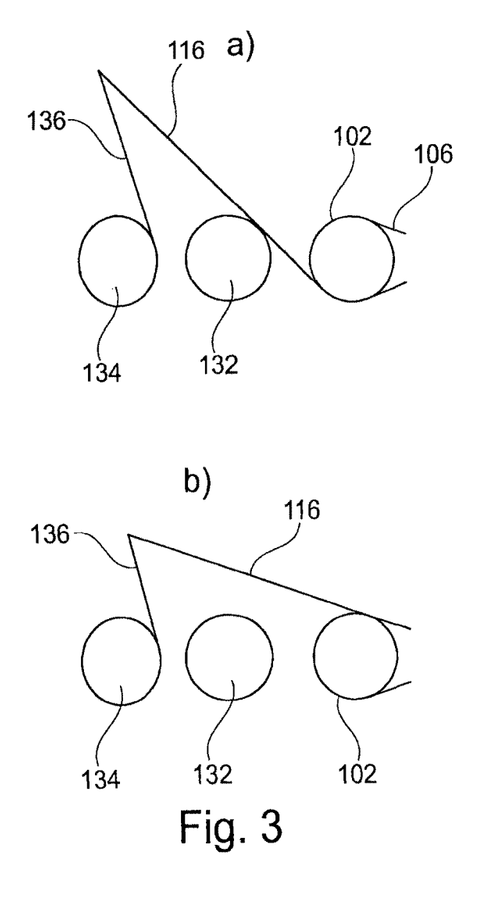
FIG. 3a shows a schematic cross-sectional view of a foil deployment mechanism according to an embodiment of the present invention in a first state.
FIG. 3b shows the foil deployment mechanism of FIG. 3a in a second state.

As shown in FIG. 3, the foil deployment mechanism 100 may further comprise a first holding element 134 which is positioned adjacent to a side of the guiding structure 126 which faces away from the second drum 104, and a first strut 136, wherein a first end of the strut 136 is connected to the first holding element 134, and wherein a second end of the first strut 136 is connected to the second end 120 of the rigid longitudinal element 116 or directly to the foil 124. Here, the first holding element 134 is a drum around which a part of the first strut 136 can be wound/unwound. In this way, when winding/unwinding the foil 124 on/from the third drum 122, the first strut 136 is also wound/unwound onto/from the first holding element 134. Thus, additional stability is given to the foil 124 in the unwound state, on the other hand the foil deployment mechanism 100 still is very compact since the first holding element 134 can be placed close to the guiding structure 126. In FIG. 3a, the foil 124 has been completely unwound from the third drum 122, and the angle $\alpha$ has reached the maximum possible angle $\alpha$ max, whereas in FIG. 3b, the foil 124 has not yet been completely unwound from the third drum 122, and the angle $\alpha$ has not yet reached the maximum possible angle $\alpha$ max.

Figure 4:
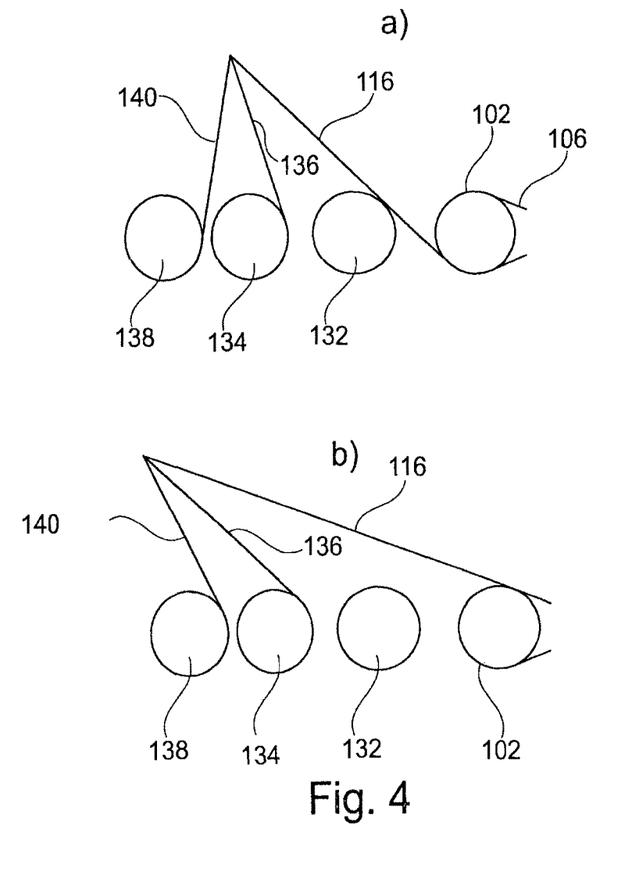
FIG. 4a shows a schematic cross-sectional view of a foil deployment mechanism according to an embodiment of the present invention in a first state.
FIG. 4b shows the foil deployment mechanism of FIG. 4a in a second state.

As shown in FIG. 4, the foil deployment mechanism 100 may further comprise a second holding element 138 which is positioned adjacent to a side of the first holding element 134 which faces away from the second drum 104, and a second strut 140, wherein a first end of the second strut 140 is connected to the second holding element 138, and wherein a second end of the strut 140 is connected to the second end 120 of the rigid longitudinal element 116 or to the foil 124. Here, the second holding element 138 is a drum around which a part of the second strut 136 can be wound/unwound. In this way, when winding/unwinding the foil 124 on/from the third drum 122, the second strut 140 is also wound/unwound onto/from the second holding element 138. Thus, additional stability is given to the foil 124 in the unwound state, on the other hand the foil deployment mechanism 100 still is very compact since the second holding element 138 can be placed close to the first holding element 134. In FIG. 4a, the foil 124 has been completely unwound from the third drum 122, and the angle α has reached the maximum possible angle α max, whereas in FIG. 4b, the foil 124 has not yet been completely unwound from the third drum 122, and the angle α has not yet reached the maximum possible angle α max. The foil deployment mechanism 100 may comprise further additional holding elements.

Figure 5:
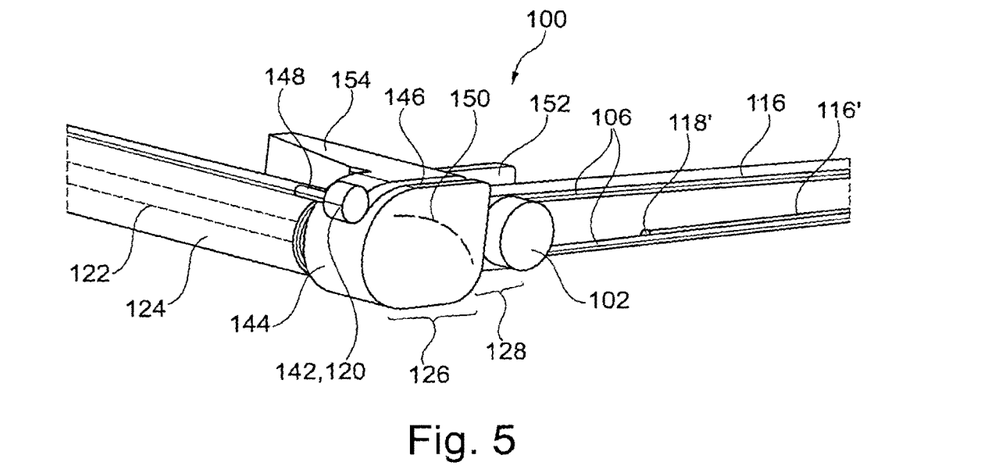
FIG. 5 shows a schematic perspective view of a foil deployment mechanism according to an embodiment of the present invention in a first state.

FIG. 5 illustrates a concrete possible realization of the foil deployment mechanism 100 shown in FIGS. 1 and 2. In this embodiment, the second end 120 of the longitudinal rigid element 116 comprises a stopper 142 which abuts against a surface 144 of the guiding structure 126 when moving the cable 106 from the second state into the first state, thereby stopping the longitudinal rigid element 116 from moving further towards the second drum 104. In this embodiment, the guiding structure 126 comprises a groove 146 along which the longitudinal rigid element 116 glides, wherein the stopper 142 is constituted by an enlarged second end 120 of the longitudinal rigid element 116 which does not fit into the groove 146 and therefore abuts against an end of the groove 146 (the surface 144) when moving the longitudinal rigid element 116 towards the second drum 104. As a consequence, it is impossible, when moving the cable 106 in a foil retraction direction, to further move the longitudinal rigid element 116 in this direction after the foil 124 is fully wound onto the third drum 122. That is, an automatic stop is provided. The groove 146 may have a curved shape as indicated by dotted line 150. However, also other groove shapes may be employed.

In the embodiment shown in FIG. 5, the guiding structure 126 serves as a supporting means for the third drum 122 (which is covered by the foil 124). Further, the second end 120 of the longitudinal rigid element 116 is connected to a spreader bar 148 to which one end of the foil 124 is fixed. The foil deployment mechanism comprises a first supporting element 152 which is connected to the guiding structure 126 and which projects along the cable 106 towards the second drum 104. The first supporting element 152 supports the first drum 102. The foil deployment mechanism further comprises a second supporting element 154 which is connected to the guiding structure 126 and which projects away from the guiding structure 126 along the third drum 122. The first supporting element 152 and the second supporting element 154 are connected with each other such that an angle formed between the first supporting element 152 and the second supporting element 154 is 90°. Thus, a surface 156 of the first supporting element 152 facing away from the first drum 102 and a surface 156' of the second supporting element 154 facing away from the third drum 122 together from a receiving surface adapted to receive a device like a solar panel or the like, for example. In this way, the foil deployment mechanism 100 can be easily connected to a device to be equipped with the foil deployment mechanism 100.

The foil 124 may have a light-reflective surface. In this way, the foil 124 can be used as a reflector. This is in particular useful if the foil deployment mechanism 100 is used together with a solar panel 250 (see e.g. FIG. 8), wherein the solar panel 250 is positioned between the first drum 102 and the second drum 104. However, it should be mentioned that the foil deployment mechanism 100 may be used also in other technical fields.

Figure 6:
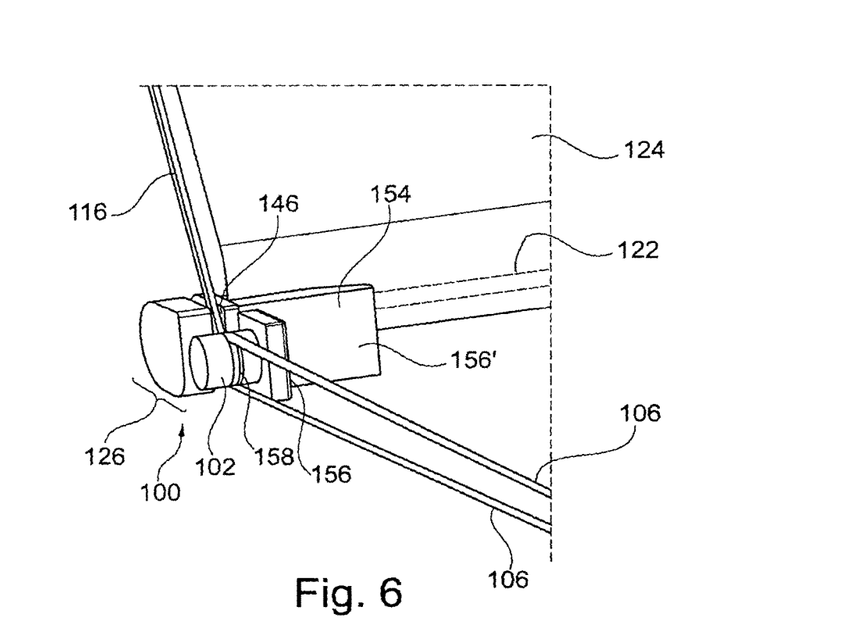
FIG. 6 shows the foil deployment mechanism of FIG. 5 in a second state and from a different perspective.

FIG. 5 shows a foil deployment mechanism 100 in the non-extended state, whereas FIG. 6 shows the foil deployment mechanism of FIG. 5 in the extended state and from a different perspective. As can be seen in FIG. 6, the first drum 102 may comprise a groove 158 adapted to receive and guide the cable 106. The groove 158 prevents that the cable 106 slides from the first drum 102.

In FIGS. 1 to 6, for sake of simplicity, only the part of the foil deployment mechanism 100 has been shown which is located in the vicinity of the first drum 102. The part of the foil deployment mechanism 100 which is located in the vicinity of the second drum 104 may have the same architecture as that shown in FIGS. 1 to 6 assuming that a second foil 124' is provided at the second drum 104 which is extended by rotating the second drum 104.

That is, the foil deployment mechanism 100 may comprise a first longitudinal rigid element 116 having a first end 118 and a second end 120, wherein the first end 118 is connected to the cable 116, and wherein the second end 120 is connected to the first foil 124, and a second longitudinal rigid element 116' having a first end 118' and a second end 120', wherein the first end 118' is connected to the cable 106, and wherein the second end 120' is connected to the second foil 124'. By moving the cable 106, the first longitudinal rigid element'116 can be moved between a first state in which the first end 118 of the first longitudinal rigid element 120 is connected to the first section S1 of the cable 106, and in which the second end 120 of the first longitudinal rigid element 116 protrudes from the first drum 102 in a direction D1 pointing away from the second drum 104, and a second state in which the second end 120 of the first longitudinal rigid element 116 protrudes in a direction D1 pointing away from the second drum 104, wherein a distance between the second end 120 and the first drum 102 is smaller in the first state than in the second state. Further, by moving the cable 106, the second longitudinal rigid element 116' can be moved between a first state in which the first end 118' of the second longitudinal rigid element 116' is connected to the third section S3 of the cable, and in which the second end 120' of the second longitudinal rigid element 116' protrudes from the second drum 104 in a direction D3 pointing away from the first drum 102, and a second state in which the second end 120' of the second longitudinal rigid element 116' protrudes in a direction D3 pointing away from the first drum 102, wherein a distance between the second end 120' and the second drum 104 is smaller in the first state than in the second state. In this way, it is possible to wind/unwind two different foils (the first foil 124 and the second foil 124') simultaneously by moving only one cable 106.

An advantage of the above described foil deployment system is that it can be easily scaled down on demand by removing for example rigid longitudinal element 116' from the cable 106 if no second foil 124' is present or an existing second foil 124' does not have to be extended. Correspondingly, the foil deployment system can be easily scaled up on demand by adding for example rigid longitudinal element 116' to the cable 106 if a second foil 124' to be extended has been added or an already existent second foil 124' has to be "activated". That is, the foil deployment mechanism 100 can be extended/restricted in its functionality by only adding/removing a minimum amount of additional elements (by adding/removing the corresponding rigid longitudinal elements 116, 116').

Figure 7:
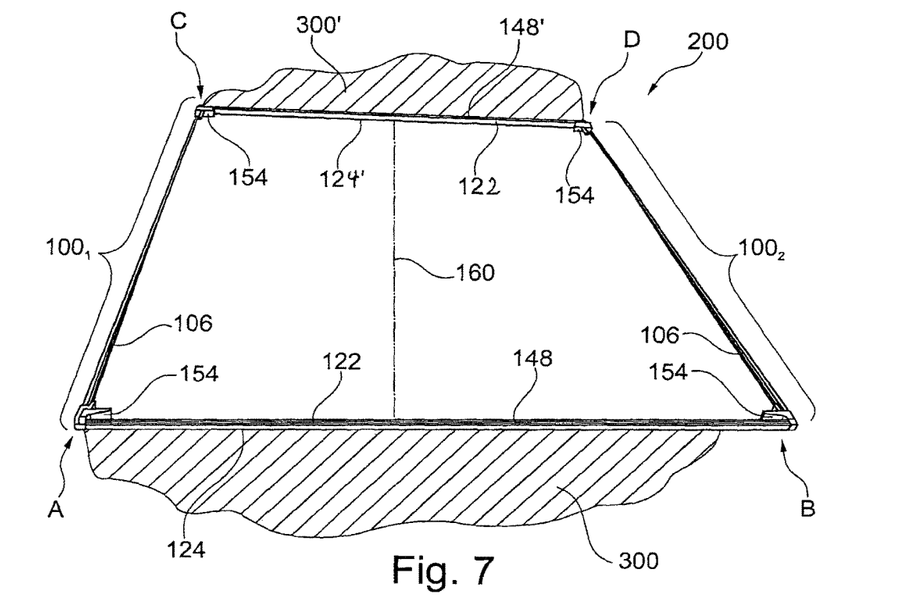
FIG. 7 shows a schematic perspective view of a foil deployment system according to an embodiment of the present invention.

The foil deployment mechanism as described above may be used, as shown in FIG. 7, in a foil deployment system 200 as a first foil deployment mechanism $100_1$ and as a second foil deployment mechanism $100_2$. Part A of the first foil deployment mechanism $100_1$ and part B of the second foil deployment mechanism $100_2$ serve to expand a first foil 124, whereas part C of the first foil deployment mechanism $100_1$ and part D of the second foil deployment mechanism $100_2$ serve to expand a second foil 124'. The first foil deployment mechanism $100_1$ has the same architecture as that of the second foil deployment mechanism $100_2$. In this embodiment, the foil deployment system 200 comprises a first spreader bar 148 which connects the second ends 120 of the longitudinal rigid elements 116 with each other, and a second spreader bar 148' which connects the second ends 120' of the longitudinal rigid elements 116' with each other (see also FIG. 8).

Figure 8:
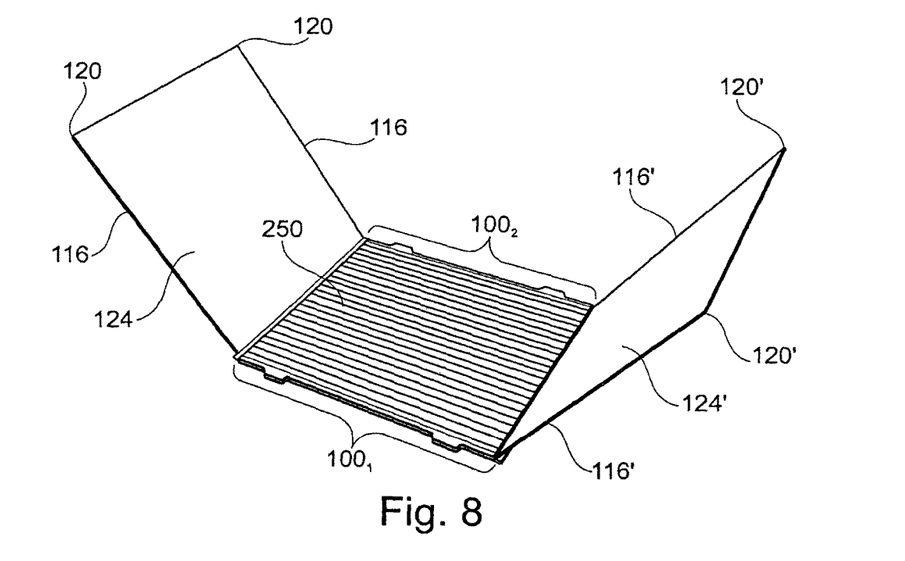
FIG. 8 shows a solar panel comprising a foil deployment system of FIG. 7 according to an embodiment of the present invention.

As shown in FIG. 8, the foil deployment system 200 may be used together with a solar panel 250. The extended foils 124 and 124' serve as reflectors (concentrators) which reflect light onto the surface of the solar panel 250.

Depending on the application, the first foil 124 and the second foil 124' may be extended by using only one common foil deployment mechanism 100, e.g. only one of the first foil deployment mechanism $100_1$ and the second foil deployment mechanism $100_2$, or a common foil deployment mechanism 100 having two longitudinal rigid elements 116 being positioned below the solar panel at a central position (indicated by dotted line 160) thereof. That is, in the context of FIG. 7, the first foil deployment mechanism $100_1$ and the second foil deployment mechanism $100_2$ may be replaced by a common foil deployment mechanism 100 located at a central position with regard to the third drum 122 as indicated by dotted line 160. As already mentioned, in this case, the common foil deployment mechanism 100 (at least the cable 106)' has to be positioned below the solar panel 250.

The drums 102, 104, 122, 132, 134, 138 may for example comprise or consist of carbon fibre reinforced plastic (CFRP).

The cable 106 may for example comprise or consist of a steel wire. Parts of the cable 106 which do not have to be wound around drums 102, 104 may also comprise or consist of carbon-fibre composite rods. Correspondingly, the struts 136, 140 may for example comprise or consist of a steel wire. Parts of the struts 136, 140 which do not have to be wound around drums 132, 134 may also comprise or consist of carbon-fibre composite rods.

The longitudinal rigid element 116 may for example comprise or consist of carbon fibre reinforced plastic and may have the shape of a tube, similar to that of a fishing rod.

The supporting elements 152, 154 may for example comprise or consist of carbon fibre reinforced plastic, aluminium, or titanium.

In the above description, embodiments of the inventive foil deployment mechanism 100 have been described in the context of a solar panel 250, wherein the solar panel 250 is positioned between the first drum 102 and the second drum 104. However, it should be mentioned that the foil deployment mechanism 100 may be used also in other technical fields. For example, the foil deployment mechanism 100 may be used to activate a shutter e.g. to shield sensitive optical instruments temporarily from excessive sunlight. For example, making reference to FIG. 7, unwinding the foil 124 from the third drum 122 may shield instruments (not shown) positioned in area 300 (located besides the third drum 122) against sunlight (by the unwound foil 124), and winding the foil 124 onto the third drum 122 may expose the instruments to sunlight again. Likewise, unwinding the foil 124' from the third drum 122' may shield instruments (not shown) positioned in area 300' (located besides the third drum 122') against sunlight (by the unwound foil 124'), and winding the foil 124' onto the third drum 122' may expose the instruments to sunlight again.

The invention claimed is:

1. A foil deployment mechanism, comprising:
    a first drum rotatable about a first longitudinal axis, and a second drum rotatable about a second longitudinal axis,
    a cable which can be moved by rotating the first drum in a first rotation direction and by rotating the second drum in a second rotation direction opposed to the first rotation direction, the cable comprising a first section which extends from a lower part of the second drum to an upper part of the first drum, a second section which is wound around a part of the first drum facing away from the second drum, a third section which extends from a lower part of the first drum to an upper part of the second drum, and a fourth section which is wound around a part of the second drum facing away from the first drum, wherein the first section and the third section intersect each other between the first drum and the second drum when being viewed along the first longitudinal axis,
    a longitudinal rigid element having a first end and a second end, wherein the first end is connected to the cable, and wherein the second end is connected to a foil, wherein, by moving the cable, the longitudinal rigid element can be moved between a first state in which the first end of the longitudinal rigid element is connected to the first section of the cable, and in which the second end of the longitudinal rigid element protrudes from the first drum in a direction pointing away from the second drum, and a second state in which the second end of the longitudinal rigid element protrudes in a direction pointing away from the second drum, wherein a distance between the second end and the first drum is smaller in the first state than in the second state; and
    a guiding structure for guiding a movement of the longitudinal rigid element caused by moving the cable, wherein the guiding structure is configured such that an angle α between an alignment of the cable in the first section and the longitudinal rigid element is changed when the first end of the longitudinal rigid element moves from an upper part of the first drum towards a lower part of the first drum while being connected to the second section of the cable.

2. The foil deployment mechanism according to claim 1, comprising a third drum arranged adjacent to the first drum and being rotatable around a third longitudinal axis, wherein the third drum is arranged such that the foil can be wound onto the third drum by rotating the third drum in a third rotation direction, and can be unwound from the third drum by rotating the third drum in a fourth rotation direction opposite to the third rotation direction, and wherein, in the first state, the amount of foil wound onto the third drum is larger than in the second state.

3. The foil deployment mechanism according to claim 2, wherein the first longitudinal axis, the second longitudinal axis, and the third longitudinal axis are aligned parallel with respect to each other.

4. The foil deployment mechanism according to claim 1, wherein the guiding structure is positioned adjacent to a side of the first drum which faces away-from the second drum, wherein a space is provided between the guiding structure and the first drum.

5. The foil deployment mechanism according to claim 4, wherein a vertical position of an upper surface of the guiding structure is positioned above a vertical position of a lower surface of the first drum.

6. The foil deployment mechanism according to claim 1, wherein the guiding structure is a drum rotatable around a fourth longitudinal axis.

7. The foil deployment mechanism according to claim 1, further comprising a holding element which is positioned adjacent to a side of the guiding structure which faces away from the second drum, and a strut, wherein a first end of the strut is connected to the holding element, and wherein a second end of the strut is connected to the second end of the longitudinal rigid element.

8. The foil deployment mechanism according to claim 7, wherein the holding element is a drum around which a part of the strut can be wound/unwound.

9. The foil deployment mechanism according to claim 1, wherein the second end of the longitudinal rigid element comprises a stopper which abuts against the guiding structure when moving the cable from the second state into the first state, thereby stopping the longitudinal rigid element from moving further towards the second drum.

10. The foil deployment mechanism according to claim 1, wherein the foil has a light-reflective surface.

11. The foil deployment mechanism according to claim 1, wherein a solar panel is positioned between the first drum and the second drum.

12. The foil deployment mechanism according to claim 1, comprising:
- a first longitudinal rigid element having a first end and a second end, wherein the first end is connected to the cable, and wherein the second end is connected to a first foil,
- a second longitudinal rigid element having a first end and a second end, wherein the first end is connected to the cable, and wherein the second end is connected to a second foil,
- wherein, by moving the cable, the first longitudinal rigid element can be moved between a first state in which the first end of the first longitudinal rigid element is connected to the first section of the cable, and in which the second end of the first longitudinal rigid element protrudes from the first drum in a direction pointing away from the second drum, and a second state in which the second end of the first longitudinal rigid element protrudes in a direction pointing away from the second drum, wherein a distance between the second end and the first drum is smaller in the first state than in the second state, and
- wherein, by moving the cable, the second longitudinal rigid element can be moved between a first state in which the first end of the second longitudinal rigid element is connected to the third section of the cable, and in which the second end of the second longitudinal rigid element protrudes from the second drum in a direction pointing away from the first drum, and a second state in which the second end of the second longitudinal rigid element protrudes in a direction pointing away from the first drum, wherein a distance between the second end and the second drum is smaller in the first state than in the second state.

13. A concentrator solar panel, comprising:
- a solar panel, and
- a foil deployment mechanism according to claim 1 connected to the solar panel.

14. A foil deployment system, comprising a first and a second foil deployment mechanism unit, each of them comprising:
- a cable which can be moved by rotating the first drum in a first rotation direction and by rotating the second drum in a second rotation direction opposed to the first rotation direction, the cable comprising a first section which extends from a lower part of the second drum to an upper part of the first drum, a second section which is wound around a part of the first drum facing away from the second drum, a third section which extends from a lower part of the first drum to an upper part of the second drum, and a fourth section which is wound around a part of the second drum facing away from the first drum, wherein the first section and the third section intersect each other between the first drum and the second drum when being viewed along the first longitudinal axis,
- a longitudinal rigid element having a first end and a second end, wherein the first end is connected to the cable, and wherein the second end is connected to a foil, wherein the foil to which the longitudinal rigid element of the first foil deployment mechanism unit is connected is the same foil to which the longitudinal rigid element of the second foil deployment mechanism unit is connected,
- wherein, by moving the cable of the first foil deployment mechanism unit, the longitudinal rigid element of the first foil deployment mechanism unit can be moved between a first state in which the first end of the longitudinal rigid element is connected to the first section of the cable, and in which the second end of the longitudinal rigid element protrudes from the first drum in a direction pointing away from the second drum, and a second state in which the second end of the longitudinal rigid element protrudes in a direction pointing away from the second drum, wherein a distance between the second end and the first drum in the first state is smaller than in the second state,
- wherein, by moving the cable of the second foil deployment mechanism unit, the longitudinal rigid element of the second foil deployment mechanism unit can be moved between a first state in which the first end of the longitudinal rigid element is connected to the first section of the cable, and in which the second end of the longitudinal rigid element protrudes from the first drum in a direction pointing away from the second drum, and a second state in which the second end of the longitudinal rigid element protrudes in a direction pointing away from the second drum, wherein a distance between the second end and the first drum in the first state is smaller than in the second state, and
- a spreader bar which connects the second ends of the longitudinal rigid elements with each other, and which is connected to the foil.

* * * * *